Nov. 29, 1966
A. S. WINDELER
3,288,895
CONTROL OF CAPACITANCE OF INDIVIDUAL WIRES
OF MULTIWIRE STRUCTURE
Filed March 13, 1963
2 Sheets-Sheet 1
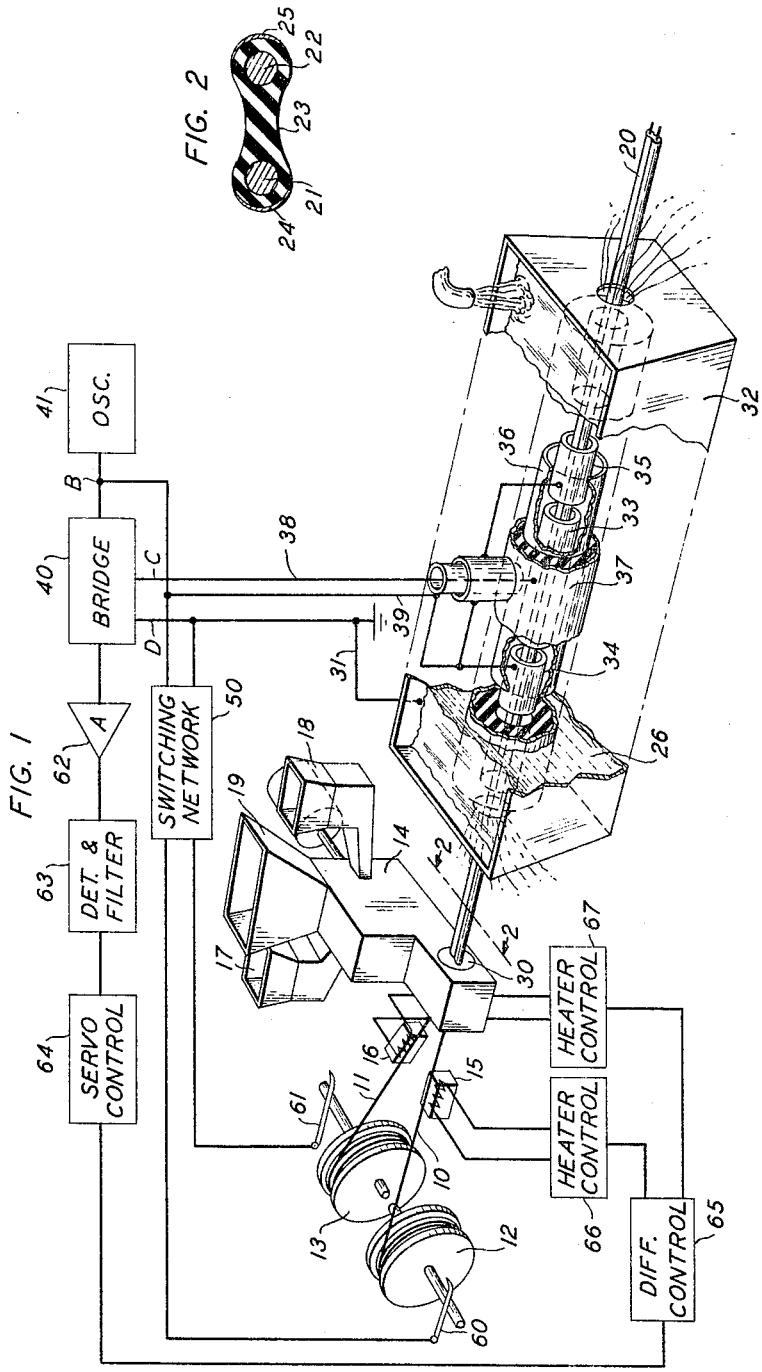
INVENTOR
A. S. WINDELER
BY
*A. E. Hirsch Jr.*
ATTORNEY Nov. 29, 1966          A. S. WINDELER          3,288,895
CONTROL OF CAPACITANCE OF INDIVIDUAL WIRES
OF MULTIWIRE STRUCTURE
Filed March 13, 1963                    2 Sheets-Sheet 2

United States Patent Office 3,288,895
Patented Nov. 29, 1966

3,288,895
CONTROL OF CAPACITANCE OF INDIVIDUAL
WIRES OF MULTIWIRE STRUCTURE
Alfred S. Windeler, Madison, N.J., assignor to Bell Telephone Laboratories, Incorporated, New York, N.Y., a corporation of New York
Filed Mar. 13, 1963, Ser. No. 264,876
12 Claims. (Cl. 264—40)

This invention relates to electrical testing apparatus and more particularly to methods of and apparatus for detecting capacitance variations in extruded cables or the like. It is concerned with the continuous measurement of the capacitance of a defined length of plastic insulated wire during manufacture so that means may be taken to minimize capacitance variations.

Whenever two electrical conductors are in reasonably close proximity, electrical capacitance exists between them. Variations in the interconductor capacitance of the wires of a message carrying cable or in the capacitance of the individual wires to ground, can seriously degrade its transmission quality. Uniformity of capacitance in the two conductors of a pair thus serves to minimize its susceptibility to external electrical fields and crosstalk and, in general, to improve its transmission characteristics. With solid plastic insulated wire, capacity unbalance is largely dependent upon conductor diameter uniformity, insulation diameter uniformity, and twist uniformity. Insulation diameter is the most difficult to control. In the manufacture of plastic covered cables of this sort, it is therefore customary to measure continuously the capacitance to ground of the conductors during or immediately after the extrusion process so that one or more variables in the extruder may immediately be altered for the slightest detected variation in insulation thickness. By maintaining essentially uniform insulation thickness, the unit length capacitance of the wire may be maintained relatively constant.

A typical capacitance monitor used in such an extruding operation is described in M. C. Biskeborn Patent 2,804,592, granted August 27, 1957. It employs a monitoring electrode submerged in a body of an electroconductive liquid. As the cable is drawn past the electrode, the liquid acts as a tight fitting conducting sheath over the exterior surface of the insulation. The coaxial capacity of the material between the center wire (ground) and the liquid (electrode potential) is then measured on a bridge or the like. To confined the measured capacity to a precisely known length, a column of the liquid is electrically isolated by a system of auxiliary guard electrodes maintained at a neutral potential of the bridge.

An extruded cable pair, i.e., a pair of conductors contained in a single plastic structure, sometimes called a "dual pair" has, in many applications, e.g., voice frequency circuits, considerably higher efficiency and a lower manufacturing cost than an equivalent twisted pair made up of individually insulated conductors. The ratio of the interaxial spacing of the wires of a dual pair to the diameter of the effective shield made up of the wires surrounding those of the dual pair, e.g., in a cable, is greater for the dual pair than is common for the twisted pair. Consequently, a dual pair can be designed to have any desired ratio thus to make the pair more efficient, i.e., to have a lower mutual capacitance for a given cable size. Capacitance balance to ground of a dual pair, however, is strongly influenced by insulation diameter. Since both wires are covered in a single coating process, control of the covering thickness over the wire individually, i.e., over different surface areas of the single structure, is a most difficult problem. Even though the wires are symmetrically positioned in the extruder during manufacture, the flow of plastic material is not always exactly even over both wires so that occasionally one wire is covered with more insulation than the other. The unit length capacitance for that wire thus differs from the unit length capacitance for the other. In particular, the arc of insulation outwardly disposed from the pair is susceptible to dimension nonuniformity. Thus, a continuous adjustment of the wire temperature, extruder aperture, or the like must be made to maintain a relatively constant unit length capacitance for each wire of the structure.

It is an object of this invention to measure continuously the unit length capacitance of each wire of a multiwire structure, pair or "quad" (four wires in a single insulating structure) so that steps may be taken during the manufacturing process to equalize the capacitance for all the wires of the structure.

It is another object of this invention to assure identical and constant unit length capacitances for the wires of a multiwire plastic insulated cable by maintaining uniform insulation depth for all wires of the cable.

It is still another object of the invention to isolate electrically the wires of a multiwire structure during a monitoring operation so that the unit length capacitance of each wire along may be measured during the manufacturing process.

These and related objects are attained in accordance with this invention by monitoring continuously the unit length capacitance of each wire of a multiwire structure, e.g., a cable pair or quad, immediately after extrusion. For detected capacitance deviations from a standard, or in general, for detected capacitance unbalance, the extrusion process is altered to adjust the thickness of insulation deposited over all or a portion of the structure to yield equal capacitance for all wires. A monitor, generally of the type discussed above in connection with the Biskeborn patent, is employed together with a bridge to measure individual wire capacitance. In accordance with the invention, each conductor is alternately connected to one leg of a bridge, so that the capacitance of a cylinder of insulation about the grounded wire may be measured. To prevent the other wires of the cable from influencing the capacitance measurement, all other wires are momentarily connected to a neutral bridge potential maintained at approximately the same potential as the measuring electrode. This is accomplished in the present invention by momentarily connecting the wires to the guard electrode of the monitoring apparatus. By this expedient, the capacitance to ground of the wire being measured is independent of that between wires and also of the capacitance of the other wires to ground.

A control signal is developed during conditions of indicated unbalance which may be used to control one of the parameters of the extrusion process, e.g., wire temperature, orifice diameter, wire speed, or the like. Preferably, one or more auxiliary layers of colored plastic materials are simultaneously extruded to coat the outer arc surfaces of the pair. The thickness of one or both of these layers is quite effective in altering the capacity to ground of the associated wire. Accordingly, in the practice of the invention, the thickness or configuration of the auxiliary colored plastic material is altered in response to the generated control signal.

These and other objects and features of the invention will be apparent from the following description of an illustrative embodiment of it, when taken in conjunction with the accompanying drawings, in which:

FIG. 1 is an illustration, partially in block schematic form, of the basic features of the invention;

FIG. 2 is an enlarged cross-section of a typical extruded multiwire structure.

Figure 3:
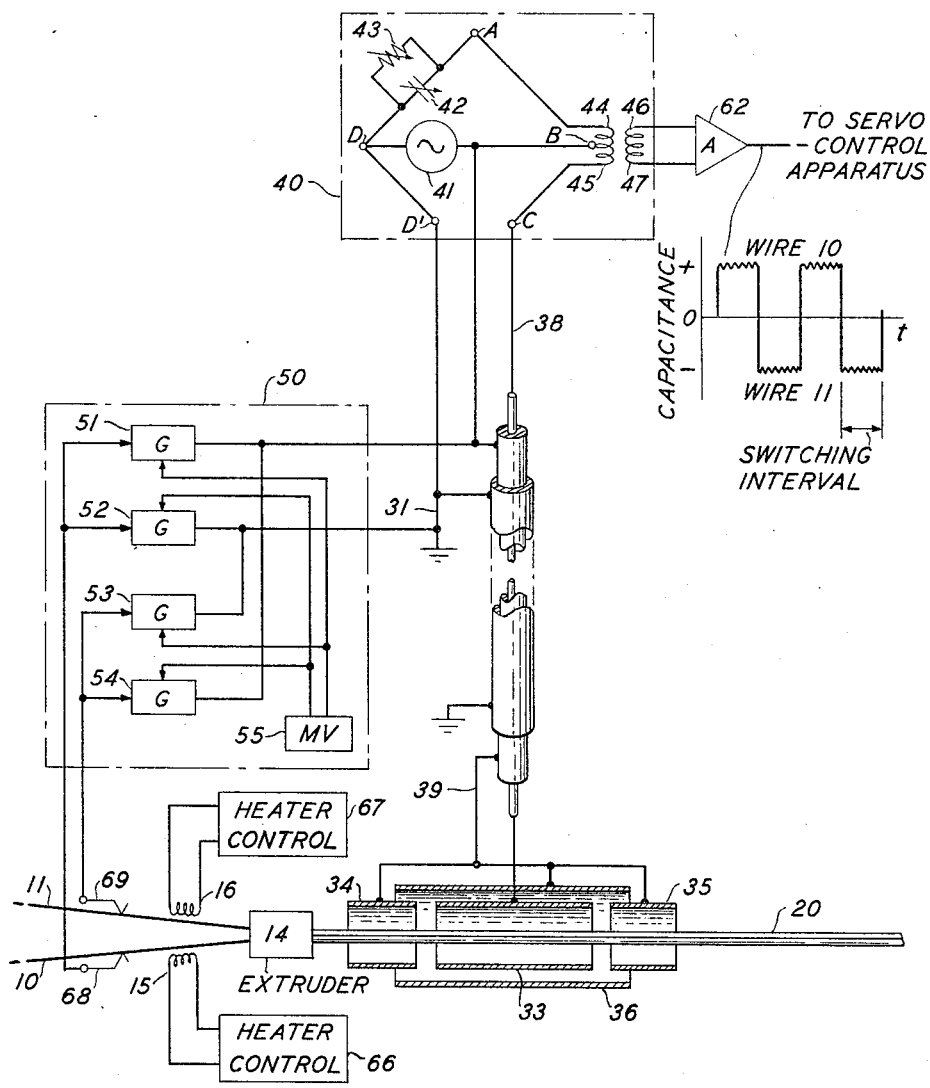
FIG. 3 is a schematic diagram of an electrical circuit forming part of the apparatus of the invention.

In the illustrative arrangement shown in FIG. 1, the principles of the invention are turned to account in maintaining precise capacitance balance to ground between the two wires of an extruded pair of wires. Two wires 10 and 11 are advanced continuously from supply reels 12 and 13, which are insulated from one another and from ground, through extruder 14 by means such as a motor driven take up capstan or the like (not shown) of conventional construction. The extruder is arranged to apply a single layer of thermal plastic insulation, such as solid or cellular polyethylene or the like, on the two wires to form a structure similar to that shown in cross-section in FIG. 2. Although the cross-section of a dual pair can take a number of forms, the one illustrated in FIG. 2 is typical. The principles of the invention are, of course, equally applicable to multiwire structures in general. Preheaters 15 and 16, positioned ahead of the extruder are preferably used to encourage an even flow of plastic on the wires. Control of the individual preheater temperatures is quite effective in establishing the depth of insulation deposited during extrusion. If it is desired to color code the wires of the dual pair as, for example, by a distinguishing colored band of plastic on the outside edges of the cable, 24 and 25 in FIG. 2, a pair of auxiliary extruders may be employed to supply colored plastic material to the main extruder. Such an operation is conventional. The auxiliary extruders are indicated schematically by the auxiliary hoppers 17 and 18 placed near the main extruder hopper 19. In actual practice, the auxiliary extruders feed into the main extruder die in such a way as to place a stripe of colored plastic on the outside edges of the dual pair. For example, one side of the pair may be marked with a stripe of red plastic and the other with green plastic. It should be noted that the thickness of the auxiliary layers of colored material materially alter the unit capacitance of the wires. Hence, the depth of the auxiliary layers may be varied to maintain capacitance balance in the pair.

Immediately after the insulated pair 20 emerges from die orifice 30 in extruder 14 it passes through a bath of electroconductive cooling fluid 26, contained in an elongated trough 32 or the like positioned generally in alignment with the path of the extruded pair, to a take up reel (not shown) or the like. The fluid level in trough 32 is maintained substantially constant and at a height sufficient to insure that the insulated wire pair remains completely immersed during its passage through the trough. In most locations ordinary tap water may be used as the electroconductive fluid.

An electrode assembly forming a part of a capacitance sensing unit is supported within trough 32 in alignment with the path of the moving pair 20. Its function is essentially identical to that of the electrode assembly described in the aforementioned Biskeborn patent. For that reason, reference is made thereto for a discussion of the considerations which must be taken into account in positioning and utilizing the assembly. Structurally, the assembly is quite different from the Biskeborn apparatus. It includes a tubular electrode 33 supported in axial alignment with the path of pair 20. A similar pair of tubular electrodes 34 and 35 are positioned on either side of electrode 33 in axial alignment with it. The three electrodes are electrically insulated from each other, although guard electrodes 34 and 35 are electrically connected together in the external circuit. Coaxially positioned about electrodes 33, 34, and 35 is an auxiliary guard electrode 36. It is generally of a diameter slightly greater than that of the inner electrodes and is of an extent to overlap slightly the insulating gaps between electrode 33 and electrodes 34 and 35. Typically its length is equal to the length of electrode 33 plus at least the total length of the two gaps, e.g., the gap between electrodes 33 and 34 and between 33 and 35. Auxiliary electrode 36 is electrically connected to the guard electrodes in the external circuit.

The entire system of electrodes is preferably supported in an insulating structure 37 which may be formed of an insulating plastic material. It has been found convenient to manufacture the electrode assembly by spacing electrodes 33, 34, and 35 on an inflated form and holding electrode 36 in precise alignment by means of a jig or the like while the entire structure is encapsulated in epoxy resin or the like. The inflatable form is then withdrawn to leave the unitary structure. Other manufacturing techniques may, of course, be employed. Regardless of the exact technique, however, it is preferable to fill the gaps between electrodes completely with solid insulating material, so that as the entire electrode structure is immersed, the conductive bath is restricted to a column within the tubular structure formed by electrodes 33, 34, and 35. As indicated above, the guard electrode structure is then effective in electrically isolating a column of the conductive fluid.

As the insulated cable 20 is advanced through the immersed electrode structure, each wire of the pair and the column of liquid within the aperture of the electrode assembly form, essentially, coaxial plates of a condenser in which the dielectric is the plastic covering of the pair. The liquid within the aperture of electrode 33 is, of course, maintained at the electrical potential of electrode 33. Further, by means of guard electrodes 34, 35, and 36, electrode 33 and the column of liquid within it are effectively isolated longitudinally from the rest of the liquid in the grounded trough 32. The column of water extending from guard 34 to the end of the assembly acts as a resistor isolating the guard 34 from the water in trough 32. The column from guard electrode 35 to the other end isolates electrode 35 in similar fashion.

The terminals of the capacitor formed by the isolated column of liquid and electrode 33 are connected to point C of bridge circuit 40 by lead 38 and ground 31. Guard electrodes 34, 35, and 36 are connected to each other and by way of lead 39 to a neutral point B of the bridge. Another arm of the bridge (AD in FIG. 3) is provided with a reference capacitor, whose capacitance is selected as a typical value for a unit length of each wire of the pair. So long as the unit length capacitance of each wire matches the value of this capacitor within a predetermined range, the bridge is balanced. Alternating current signals at a frequency in the neighborhood of 20 k.c.p.s. are supplied to the bridge from oscillator 41.

Switching network 50 is effective to connect wires 10 and 11 alternately to ground and to guard electrode potential. It preferably is a fully electronic network, for example, using diodes or the like of any well known construction, to effect the switching operation at a periodic rate. The switching frequency should be substantially greater than the frequency of random variations of the extruded insulation. In practice, a conservative frequency of about 100 c.p.s. has been found to be satisfactory. Wires 10 and 11 may be grounded in any convenient fashion. In the illustration, grounding is accomplished by connecting reels 12 and 13 alternately to ground by way of brushes 60 and 61. Preheaters 15 and 16 and die 30 in extruder 14 must, of course, be insulated from ground. Diamond tips or the like are normally used so that this condition is easily met. As each wire is connected to ground, the unit length capacity of the plastic material surrounding it is measured in bridge 40. To prevent the other wire of the dual pair 20 from affecting the measurement, switching network 50 momentarily connects the other wire to a neutral bridge potential, namely, the potential at B of guard electrodes 34, 35, and 36. This serves to eliminate interwire capacitance effects and the capacitance of the nonmeasured wire to ground.

Unit lentghs of the dielectric of both wires are thus measured in alternation of the switching rate. As the unit length capacitance of either wire deviates from the acceptable standard, bridge unbalance occurs and a signal is delivered via amplifier 62 to detector and filter 63. Signals for the alternate switching conditions are filtered to produce an alternating current signal the magnitude of which approaches zero when the two wires of the pair are balanced, and which exhibits a significant positive or negative value (or both in alternation) when the bridge is unbalanced. The phase of the signal with respect to the switching frequency indicates the direction of any unbalance and the magnitude of the signal denotes the deviation in capacitance of one wire from that of the others. A smooth signal of this sort is supplied to servo control apparatus 64 to regulate the magnitude and phase of its output signal. This control signal may be used as desired to alter the rate of plastic flow on one or both of the wires of the pair at extruder 14. Preferably it is used to actuate a differential control network 65, well known to those skilled in the servo mechanism art, which in turn energizes heater controls 66 and 67 and preheaters 15 and 16. As indicated above, the preheat temperatures of the individual wires influence the depth of plastic deposited on the wires during extrusion. Alternatively, the signals developed by servo control 64 may be used to adjust the position of the wires in die 30, or the rate at which the auxiliary colored plastic layers are deposited on the wires.

Details of bridge 40 and the electrical circuit which interconnects it with the sensing and guard electrodes are shown in somewhat greater detail in FIG. 3. The bridge itself, which may be in all respects similar to the one described in the Biskeborn patent, includes a standard reference capacitor 42 connected in arm AD which may, if desired, be shunted by a variable resistor 43. Capacitor 42 normally is adjusted to a value equivalent to the acceptable unit length capacitance of each of the wires of dual pair 20. Arms AB and BC of the bridge include low impedance windings 44 and 45, respectively, of the primary of a transformer 46, connected serially with B as an effective centertap point. Primary windings 44 and 45 are nearly perfectly coupled, e.g., are closely spaced and bifilarly wound, and are of extremely low resistance. With closely coupled, low resistance primaries, an impedance shunting either or both primary has virtually no effect on the voltage developed in the secondary. The two arms AB and BC are thus perfectly balanced over a wide range. Oscillator circuit 41 energizes the bridge at terminals BD, and secondary winding 47 of transformer 46 couples energy developed in the primary windings to the external circuit including amplifier 62 or the like.

The capacitance existent between one of the wires of pair 20 and the outer insulation surface is connected in bridge arm CD by connecting the conductor, e.g., 10 or 11, to ground, terminal D (and hence D') of bridge 40 to ground, and electrode 33 to bridge terminal C by way of lead 38. In accordance with an important feature of the invention, guard electrode assembly 34, 35, 36 is connected via lead 39, which may be coaxially arranged with lead 38, to point B of bridge 40. The assembly is thus at an electrically neutral point of the bridge and the impedance to ground of this assembly appears equally divided in balanced bridge arms and so of no consequence. Due to the low impedance of the BC arm, the guard is at the same potential as the measuring electrode.

If the capacitance in arm CD of the bridge is equal to the value of standard capacitance 42, bridge 40 is balanced and no potential is developed in the output winding of transformer 46. When these two capacitances are not equal, however, a potential is developed in the transformer secondary which is conveyed to amplifier 62. Further, the magnitude of the signal is an indication of the extent of the capacitance difference, and the phase of the signal is an indication of the direction of the variations from our acceptable standard, that is, whether the capacitance is greater or less than the acceptable.

In order to measure alternately the unit length capacitances of the two wires of dual pair 20, one or the other but not both of the wires is momentarily grounded and the other wire is momentarily connected to guard electrode potential through the action of automatic switching device 50. Switch 50 essentially performs the function of a double-poll, double-throw switch in momentarily connecting each wire alternately to ground and to neutral terminal B of the bridge. Preferably switch 50 is a fully automatic electronic device and may take any one of a number of forms well known to those skilled in the art. One simple one is illustrated. It includes transmission gates 51, 52, 53, and 54 connected in pairs between brushes 68 and 69 and terminals B and D of bridge 40. The gates are selectively actuated in pairs by signals developed in a stable multivibrator 55. Thus, during one portion of the switching cycle, gates 52 and 54 are actuated by a signal developed by multivibrator 55 and gates 51 and 53 are deactuated by the same or a related signal. This serves to connect wire 10 of dual pair 20 via brush 68 and gate 52 to ground, e.g., to terminal D of bridge 40, and wire 11 of the pair via brush 69 and gate 54 to neutral terminal B of the bridge. The capacitance of a unit length of wire 10 and its insulation is thus compared with standard capacitance 42 while wire 11 and its plastic dielectric sleeve is isolated from the circuit through its connection to guard electrode potential. During the next cycle of multivibrator 55, a signal is developed which actuates transmission gates 51 and 53. Gates 52 and 54 are deactuated during this interval. Wire 11 is thus connected via gate 53 to ground for measurement and wire 10 is connected via gate 51 to terminal B of the bridge. The frequency of multivibrator 55 is adjusted such that switching takes place at a rate commensurate with the rate at which dual pair 20 passes through the electrode structure assembly. Thus, capacitance measurements are made for unit lengths of wire which are sufficiently close together to give a running indication of wire quality.

So long as the unit length capacitances of the two wires are sufficiently close to an acceptable capacitance value for a unit length, bridge unbalance for one or both of the wires is below a tolerable threshold, and the output of amplifier 62 resembles a low amplitude square wave alternately going positive and negative at the switching interval. A typical wave form is indicated at the output terminal of amplifier 62 in FIG. 3. Should either one or both of the unit capacitances momentarily exceed the tolerable threshold, the bridge becomes considerably unbalanced and the output of amplifier 62 exceeds the reference level for that switching interval. Excessive unbalance signals are detected and utilized to generate a suitable servo control signal of proper amplitude and phase to actuate heater controls 66 and 67 or the like. Thus, the detected and smoothed bridge unbalance signal is used to alter the preheat temperature of wires 10 or 11 or both so that the rate of insulation deposition is adjusted to bring the unit length capacitance of the extruded dual pair 20 within acceptable limits. As indicated above, the servo control signal may be used, as desired, to control other variables of the extrusion process such as the depth of color coded insulation stripes applied to one or both sides of dual pair 20.

The above-described arrangements are merely illustrative of the application of the principles of the invention. Although the method of and apparatus for detecting capacitance variation has been described in detail only for an insulated pair, similar considerations hold for insulated quads and, in general, for multiple wire structures. For these structures, an additional line terminal and pair of pole terminals in switch 50 are utilized to insure that only one wire of the structure is grounded at any one time, i.e., is connected to terminal D of bridge 40, and that all other wires are connected to guard, i.e., to terminal B of the bridge. Numerous other arrangements may, of course, be devised by those skilled in the

What is claimed is:

1. Apparatus for indicating differences in the insulation capacitance between the individual wires of a multiwire structure which comprises a first electrode, a guard electrode structure insulated from and mounted in spaced alignment with said first electrode, means for submerging said first electrode and said guard structure in a bath of conductive fluid, means for advancing said multiwire structure through said bath in proximity to said electrodes, a bridge circuit which includes first and second pairs of impedance arms, bridge energizing means, and means for indicating impedance unbalance in either of said pairs of arms, means for connecting said first electrode to one end of one arm of said first pair of arms, means for generating a periodic switching signal, means actuated by said switching signal for systematically and individually connecting each wire of said multiwire structure to the second end of said one arm, means for connecting said guard electrode structure to the junction of the arms of said second pair of impedance arms, means actuated by said switching signal for connecting all of the wires of said multiwire structure not momentarily connected in said arm of said first pair to said junction, and means for indicating the algebraic magnitude of the differences in impedance unbalance in said first pair of arms as the wires of said multiwire structure are connected therein.

2. Apparatus as defined in claim 1 wherein said means actuated by said switching signal for systematically and individually connecting each wire of said multiwire structure to the second end of said one arm and said means actuated by said switching signal for connecting all wires of said multiwire structure not momentarily connected to said junction comprises, a plurality of transmission gate circuits, means for connecting each wire of said multiwire structure respectively to the input terminals of a corresponding pair of said gates, means for connecting the output terminals of a first gate of each of said pairs of gates to the junction of the arms of said first pair of impedance arms of said bridge, and means for connecting the output terminals of the second gate of each of said pairs of gates to said junction of the arms of said second pair of arms.

3. Apparatus as defined in claim 1 wherein said first electrode comprises a tubular element of prescribed length, and wherein said guard electrode structure comprises a pair of tubular elements of prescribed lengths and of essentially the same diameter as said first electrode structure positioned in substantial axial alignment with and respectively in spaced relation to each end of said first electrode, and a third tubular element of somewhat greater diameter than said first electrode and of a length equal to the length of said first electrode structure plus at least the total length of the longitudinal separation between said first electrode and each of said aligned tubular guard electrode elements mounted coaxially with and in spaced relation to said first electrode and said guard electrode structure.

4. Capacitance measuring apparatus comprising a bath of conductive fluid, a first electrode and an associated guard electrode structure positioned in spaced relation in said bath, a capacitive impedance bridge energized by an alternating current source, means for connecting said guard electrode structure to a neutral point of said bridge, a standard capacitance connected in a first ratio arm of said bridge, means for automatically connecting said first electrode and each conductive member of an insulated pair of wires positioned in said bath in proximity to said electrodes sequentially in a corresponding second ratio arm of said bridge, whereby the capacitance between said connected wire of said pair and said first electrode within the bounds of said associated guard structure constitutes the capacitance of said corresponding bridge arm, means for automatically connecting the conductive member of said pair not connected in said bridge arm to said neutral point of said bridge, and means responsive to variations in the capacitance balance of said first and second ratio arms for developing a control signal.

5. Capacitance measuring apparatus as defined in claim 4 wherein said means for automatically connecting said first electrode and each conductive member of an insulated pair of wires sequentially in a corresponding second ratio arm of said bridge and said means for automatically connecting the conductive members of said pair to said neutral point of said bridge comprises, means for connecting said first electrode to one end of said second ratio arm of said bridge, a pair of individual switching elements each including first and second load terminals and a line terminal, means for connecting each wire of said pair to the line terminal on one of said switching elements, means for connecting the second end of said second ratio arm to opposite load terminals of each of said switching elements, means for connecting said neutral point of said bridge to respectively opposite load terminals of said switching elements, and means for automatically and sequentially actuating both of said switching elements together at a substantially regular rate, whereby the line terminals of both of said switches are periodically and automatically connected to said first and said second load terminals in alternation, thus to connect in alternation one of said conductive members to said second end of said second ratio arm and the other one of said conductive members to said neutral point of said bridge.

6. Apparatus for detecting differences in the insulation capacitance of the individual wires of a multiwire structure which comprises, in combination, an electrode structure supporting a column of electroconductive liquid, means for continuously advancing an insulated multiwire structure through said electrode, an impedance bridge including a first pair of balanced arms, and a standard capacitance in one ratio arm of a second pair of arms, means for automatically connecting sid electrode and each of said wires of said multiwire structure in alternation in the second arm of said second pair of arms, whereby the insulation capacitance of a length of said multiwire structure with relation to connected wire forms the capacitance of said second ratio arm, means including a guard electrode structure for confining the length of said insulation effective in said ratio arm to a prescribed length, means for connecting said guard electrode structure to the junction point of said first pair of balanced arms, means for automatically connecting the wires of said multiwire structure not momentarily connected in said second ratio arm to said junction point of said first pair of arms, means for energizing said bridge, and means for developing a signal indicative of the momentary difference between the capacitance of a confined length of insulation about one wire of said multiwire structure and the capacitance of substantially equal confined lengths of insulation about the other wires of said structure.

7. Apparatus for measuring capacitance differences between the wires of an extruded pair of wires coated with a unitary plastic insulation structure, which comprises, in combination, an electrode structure supporting a column of electroconductive liquid, means for advancing an insulated pair of wires through said electrode, means for electrically isolating said electrode and a portion of the contained liquid column, means for maintaining said electrically isolating means at substantially the potential of said electrode, means for developing a cyclically varying switching signal, means responsive to said switching signal for applying an alternating voltage between said electrode and each of said wires in alternation, means responsive to said switching signal for connecting the wire not connected to said electrode to said electrically isolating means, means for alternately comparing the capacitance between said isolated electrode and successive increments of each of the wires advancing therethrough to the capacitance of a reference capacitor, and means for developing a control signal indicative of the algebraic magnitude of the difference in insulation capacitance between the wires of said extruded pair.

8. Apparatus as defined in claim 7, in combination with, means responsive to said control signal for altering the configuration of said plastic insulating structure coating said pair of wires.

9. Apparatus as defined in claim 7, in combination with means for depositing an auxiliary plastic layer having a visibly distinguishable characteristic in proximity to one wire of said pair of wires, and means responsive to said control signal for altering the configuration of said auxiliary plastic layer.

10. The method of detecting insulation capacitance variations in the wires of an extruded cable which comprises the steps of, advancing an insulated multiwire structure through a body of electroconductive liquid, electrically isolating a column of said liquid surrounding a predetermined length of said insulated structure, automatically and sequentially applying an alternating electrical potential between said electrically isolated liquid column and each of the wires of said multiwire structure in alternation, automatically connecting each of the remaining wires of said multiwire structure not energized by said electrical potential to the potential of said electrically isolated liquid column, measuring the capacitance between said liquid column and that one of said wires momentarily energized by said potential, and continuously comparing said measured capacitance against a predefined standard value of capacitance.

11. In apparatus for coating a dual pair of wires with insulating material, said apparatus containing means for measuring the capacitance per unit length of the material relative to a wire, that improvement which comprises
automatic switching means for sequentially and repetitively connecting said measuring means at a specified rate first to one and then to the other of said dual pair of wires, and
means for deriving a control signal from said measuring means to maintain the capacitance per unit length of the material on each wire in said dual pair between two selected values.

12. Apparatus as in claim 11 wherein said automatic switching means comprises
four transmission gates, each possessing an input terminal and an output terminal, the input terminals of the first and second gates being connected to one wire in said dual pair, the input terminals of the third and fourth gates being connected to the other wire in said dual pair, the output terminals of said first and fourth gates being connected to a first selected point of said measuring means, and the output terminals of said second and third gates being connected to a second selected point of said measuring means, and
means for producing a periodic signal which first simultaneously actuates said first and third gates and deactuates said second and fourth gates and then simultaneously deactuates said first and third gates and actuates said second and fourth gates.

References Cited by the Examiner
UNITED STATES PATENTS

| | | | |
|---|---|---|---|
| 2,246,149 | 6/1941 | Troche et al. | 18—13 X |
| 2,369,858 | 2/1945 | Ryan | 18—13 |
| 2,601,703 | 7/1952 | Sawyer | 264—40 |
| 2,607,294 | 8/1952 | Lindman | 264—40 |
| 2,698,969 | 1/1955 | Keough | 18—13 X |
| 2,789,196 | 4/1957 | Minchenko et al. | 324—60 X |
| 2,804,592 | 8/1957 | Biskeborn. | |
| 2,820,987 | 1/1958 | Bunch | 18—13 X |
| 3,064,090 | 11/1962 | Hersey | 324—60 X |
| 3,070,844 | 1/1963 | Warnken | 18—36 |
| 3,072,967 | 1/1963 | Mathews et al. | 18—36 |
| 3,120,638 | 2/1964 | Bradford | 324—60 |
| 3,122,782 | 3/1964 | Moore | 18—2 |
| 3,135,916 | 6/1964 | Tannenbaum et al. | 324—60 |
| 3,159,786 | 12/1964 | Bayne | 324—60 |
| 3,175,247 | 3/1965 | Morrison et al. | 18—13 |
| 3,185,924 | 5/1965 | Locher | 324—61 |

ROBERT F. WHITE, *Primary Examiner.*

ALEXANDER H. BRODMERKEL, *Examiner.*

F. MARLOWE, L. S. SQUIRES, *Assistant Examiners.*